United States Patent
Kim et al.

(10) Patent No.: US 11,070,870 B2
(45) Date of Patent: Jul. 20, 2021

(54) METHOD FOR DISPLAYING IMAGE AND MOBILE ROBOT IMPLEMENTING SAME

(71) Applicant: LG ELECTRONICS INC., Seoul (KR)

(72) Inventors: Byungjoon Kim, Seoul (KR); Sul Ran Kim, Seoul (KR); Jongook Yoon, Seoul (KR); Hyungjin Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/736,785

(22) Filed: Jan. 7, 2020

(65) Prior Publication Data
US 2020/0404364 A1  Dec. 24, 2020

(30) Foreign Application Priority Data

Jun. 24, 2019 (WO) ................ PCT/KR2019/007584
Aug. 30, 2019 (KR) ........................ 10-2019-0107599

(51) Int. Cl.
*H04N 21/4363* (2011.01)
*G06K 9/00* (2006.01)

(52) U.S. Cl.
CPC ... *H04N 21/43637* (2013.01); *G06K 9/00664* (2013.01)

(58) Field of Classification Search
CPC ......... H04N 21/43637; H04N 21/4524; H04N 21/44227; H04N 21/44008; H04N 21/4516; H04N 21/43615; H04N 21/4122; H04N 21/4788; H04N 21/44218; G06K 9/00664; G06F 3/048; B25J 11/00; B25J 9/1697; B25J 9/161; B25J 19/023
See application file for complete search history.

(56) References Cited

U.S. PATENT DOCUMENTS

2017/0203446 A1* 7/2017 Dooley .............. H04N 5/23216
2018/0088057 A1* 3/2018 Hashikami ........... G07C 5/0808

FOREIGN PATENT DOCUMENTS

| JP | 2003050559 | | | 2/2003 |
| JP | 2003050559 | A | * | 2/2003 |
| JP | 2016163233 | | | 9/2016 |
| KR | 20070006505 | | | 1/2007 |
| KR | 20110072292 | | | 6/2011 |
| KR | 20110072292 | A | * | 6/2011 |
| KR | 20110072292 | A | * | 6/2011 |
| KR | 20150064309 | | | 6/2015 |

OTHER PUBLICATIONS

PCT International Application No. PCT/KR2019/007584, International Search Report dated Mar. 18, 2020, 3 pages.

* cited by examiner

*Primary Examiner* — Brent D Castiaux
(74) *Attorney, Agent, or Firm* — Lee, Hong, Degerman, Kang & Waimey

(57) ABSTRACT

Disclosed herein are a method for displaying images and a robot implementing the same. The robot includes a communicator that communicates with a plurality of display devices in a space, and a controller selects a first display device, among the plurality of display devices, based on at least one of a location of a robot in the space, a situation of a user of the robot, the type of an image, and state information on the plurality of display devices, where the communicator transmits the image to the first display device and the transmitted image is executed on the first display device.

17 Claims, 7 Drawing Sheets

METHOD FOR DISPLAYING IMAGE AND MOBILE ROBOT IMPLEMENTING SAME

CROSS-REFERENCE TO RELATED APPLICATION

Pursuant to 35 U.S.C. § 119 (a), this application claims the benefit of earlier filing date and right of priority to International Application No. PCT/KR2019/007584, filed on Jun. 24, 2019, and Korean Patent Application No. 10-2019-0107599, filed on Aug. 30, 2019, the contents of all of which are hereby incorporated by reference herein in their entireties.

BACKGROUND

1. Field of the Invention

The present disclosure relates to a method for displaying images and a robot implementing the same.

2. Description of Related Art

In recent years, domestic service robots have been introduced. The robots are equipped with a display device to provide image services to users.

Specifically, they can move, receive images in relation to video calls or contents images for entertainment from an external server, and display the received images through the display device.

The display device mounted to the robots has a small screen. Accordingly, the users who are provided with the image services through the robots feel inconvenient when they watch the images on the small screen.

SUMMARY

One object of the present disclosure is to provide a method for displaying an image and a robot implementing the same by overcoming size limits of a screen of a robot that provides images services, thereby allowing a user to watch the images on a large screen.

Another objective of the present disclosure is to provide a method for displaying an image and a robot implementing the same by using a robot as a hub of networks broadcasting the image, thereby allowing a user to watch the image more conveniently.

The present disclosure is not limited to the above-mentioned objectives, and other objectives and advantages of the present disclosure which are not mentioned above can be understood from the following description and can be more apparently understood from embodiments of the disclosure. It can be easily understood that objectives and advantages of the present disclosure will be able to be embodied by means described in the appended claims and combinations thereof.

A robot according to an embodiment includes a communicator that communicates with a plurality of display devices in a space, and a controller that selects a first display device among the plurality of display devices based on at least one of a location of a robot in the space, a situation of a user of the robot, the type of an image, and state information on the plurality of display devices, where the communicator transmits the image to the first display device and the transmitted image is executed on the first display device.

A method for displaying an image using a robot according to an embodiment includes selecting, by a controller, a first display device among a plurality of display devices based on at least one of a location of a robot in a space, a situation of a user of the robot, the type of an image, and state information on the plurality of display devices in the space, and transmitting, by a communicator, the image to the first display device.

The present disclosure enables a user to watch an image provided by a robot on a large screen.

The present disclosure enables a user to watch an image more conveniently by using a robot as a hub of networks broadcasting the image.

The present disclosure is not limited to the above-mentioned effects, and various effects of the present disclosure may be drawn based on configurations of the disclosure by one having ordinary skill in the art to which the disclosure pertains.

DETAILED DESCRIPTION

Hereinafter, embodiments of the present disclosure will be described in detail with reference to the accompanying drawings such that the present disclosure can be easily by those skilled in the art. The present disclosure can be embodied in various forms and is not limited to the embodiments.

Parts which are not associated with description will be omitted in order to clearly describe the present disclosure, and the same or similar elements over the entire specification will be referred to by the same reference signs. Some embodiments of the present disclosure will be described in detail with reference to the accompanying drawings. In the drawings, the same elements will be referred to by as the same reference signs as possible. In the following description, when detailed description of the relevant known configurations or functions is determined to obscure the important point of the present disclosure, the detailed description will be omitted.

Terms such as first, second, A, B, (a), and (b) can be used to describe elements of the present disclosure. These terms are merely used to distinguish one element from another element and the essence, order, sequence, number, or the like of the elements is not limited to the terms. If it is mentioned that an element is "coupled" or "connected" to another element, it should be understood that the element is directly coupled or connected to another element or still another element may "interposed" therebetween or the elements may be "coupled" or "connected" to each other with still another element interposed therebetween.

The singular forms "a", "an" and "the" are intended to include the plural forms as well, unless explicitly indicated otherwise. It will be further understood that the terms "comprise" or "have," when used in this specification, specify the presence of stated features, integers, steps, operations, elements, components or combinations thereof but do not preclude the presence or addition of one or more other features, integers, steps, operations, elements, components or combinations thereof.

The terms "A or B", "at least one of A or/and B", or "one or more of A or/and B" as used herein include all possible combinations of items enumerated with them. For example, "A or B", "at least one of A and B", or "at least one of A or B" means (1) including at least one A, (2) including at least one B, or (3) including both at least one A and at least one B.

In embodying the present disclosure, elements can be segmented and described for the purpose of convenience of explanation, these elements may be embodied in one device or module, or one element or may be divided and embodied into two or more devices or modules.

In this specification, a robot may denote a machine capable of automatically handling assignments or capable of automatically operating, using capabilities held by the robot. Specifically, the robot that recognizes environments, makes its own decisions and performs operations may be referred to as an intelligent robot. The operations of the robot include a variety of functions such as cleaning, guiding, drawing up a map, offering contents and the like, and a security function and the like that are provided by a mobile device.

Robots may be classified as industrial robots, medical robots, domestic robots, military robots and the like depending on specific purposes or fields.

The robot may be provided with a driver including an actuator or a motor to perform various physical operations such as movements of robot joints and the like. Additionally, a mobile robot includes wheels, a brake, a propeller and the like in a driver to navigate on the ground or in the air through the driver.

Figure 1:
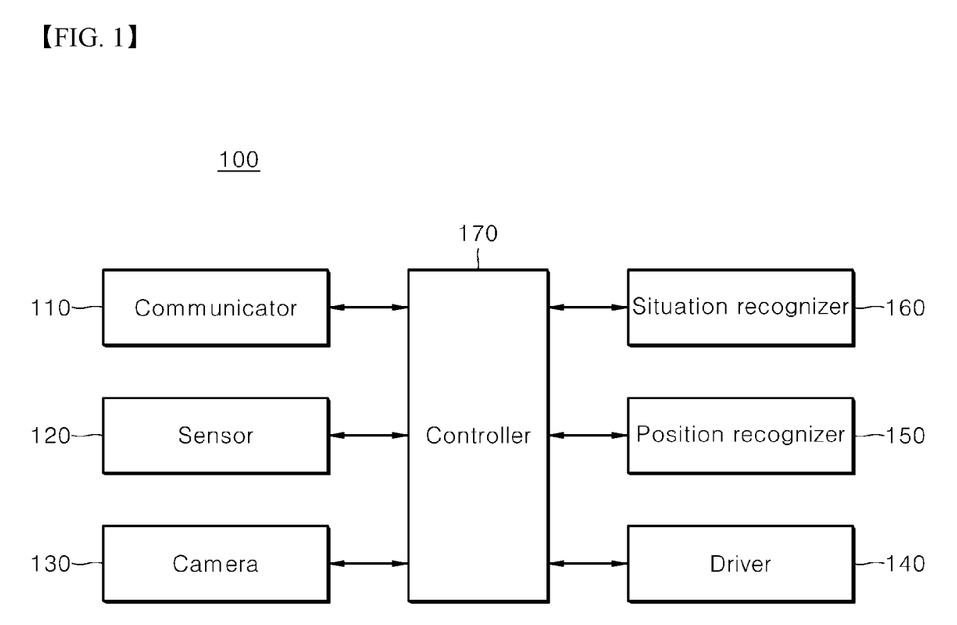
FIG. 1 is a schematic view illustrating a configuration of a robot according to an embodiment of the present disclosure.

FIG. 1 is a schematic view illustrating a configuration of a robot according to an embodiment of the present disclosure.

The robot 100 may be a mobile robot that moves in a space, and may be a robot that transmits an image to any one of a plurality of display devices in a space. The image may be an image that is stored in the robot 100, or may be an image that is received from an external server through a below-described communicator 110.

Figure 2A:
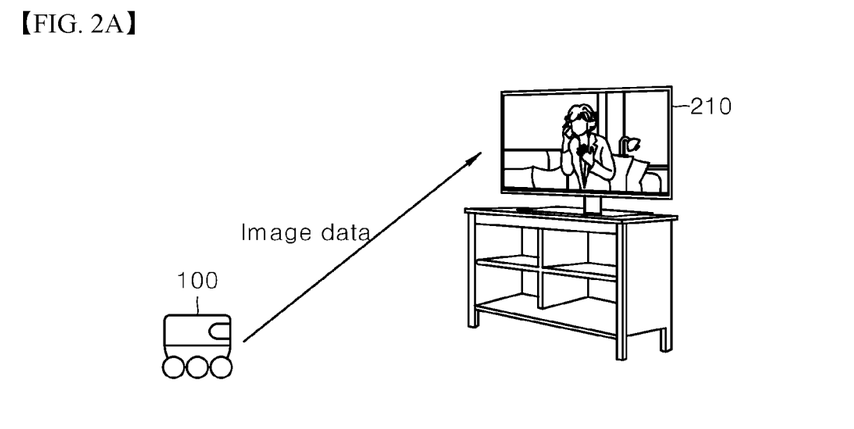
FIGS. 2A and 2B are views describing concepts of functions of a robot according to an embodiment of the present disclosure.
Figure 2B:
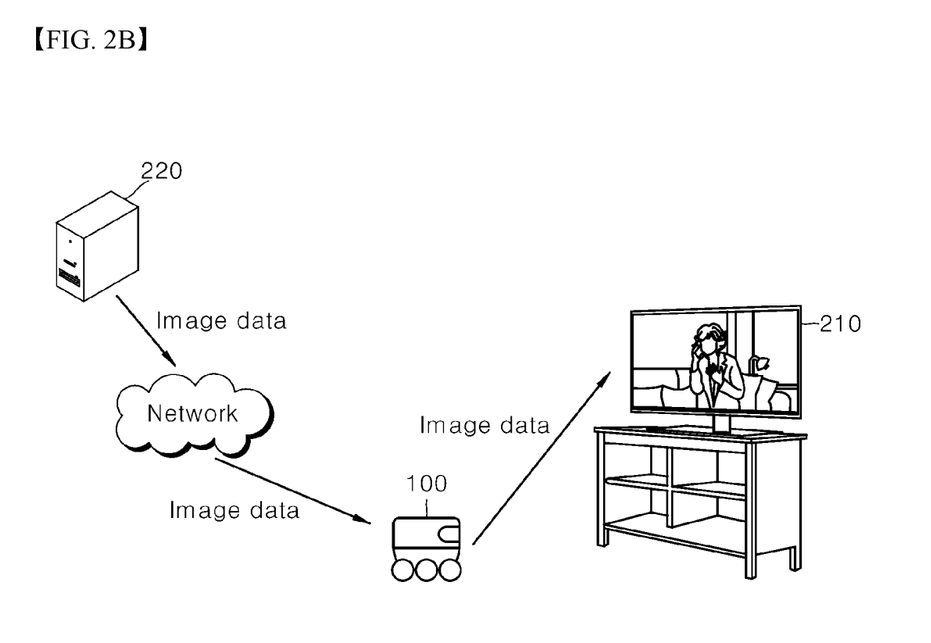

FIGS. 2A and 2B show a concept in which the robot 100 transmits image data to the display device.

FIG. 2A shows a concept in which the robot 100 transmits pre-stored image data to a display device 210, and in which the display device 210 provides the transmitted image data to a user.

FIG. 2B shows a concept in which the robot 100 receives image data from an external server 220 and transmits the received image data to a display device 210, and in which the display device 210 provides the transmitted image data to a user.

Below, suppose that an image is received from an external server 220 through a communicator 110 for convenience of description. However, the present disclosure is not limited.

Referring to FIG. 1, the robot 100 includes a communicator 110, a sensor 120, a camera 130, a driver 140, a position recognizer 150, a situation recognizer 160 and a controller 170.

Functions of each component are specifically described hereunder.

The communicator 110 communicates with en external server 220, and a plurality of display devices and the like in a space. Specifically, the communicator 110 receives an image from the external server 220 and transmits the received image to the display devices. In this case, the image includes motion pictures.

The communicator 110 may include a mobile communication module, a short range communication module and the like.

The mobile communication module may transmit wireless signals to and receive the same from at least one of a base station, an external terminal device, and a communication server in mobile communication networks established based on technical standards or communication modes for mobile communication such as Global System for Mobile Communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), and the like.

The short range communication module for short range communication may include at least one of the technologies of Bluetooth, Radio Frequency Identification (RFID), Infrared Data Association (IrDA), Ultra Wideband (UWB), Zig-Bee, Near Field Communication (NFC), Wireless-Fidelity (Wi-Fi), Wi-Fi Direct, and Wireless Universal Serial Bus (USB).

The space may include a plurality of sub-spaces. As an example, the space may be a residential space such as an apartment and the like, and the sub-space may be a living room, a bedroom, a kitchen and the like. Additionally, the plurality of display devices may be a TV, a monitor connected with a personal computer (PC), a laptop, a tablet PC, a smart phone and the like.

The external server 220 may be a communication server for video calls and the like, or may be an image-service providing server that provides contents images. In this case, the communicator 110 may receive a first image from the communication server and a second image from the image-service providing server.

The sensor 120 acquires internal information on the robot 100, surrounding environment information on the robot 100, and the like, using various sensors. As an example, the sensor 120 may include a proximity sensor, an illumination sensor, a touch sensor, an acceleration sensor, a magnetic sensor, a G-sensor, a gyroscope sensor, a motion sensor, an RGB sensor, an infrared sensor OR sensor), a finger scan sensor, an ultrasonic sensor, an optical sensor, a LiDAR sensor, a radar sensor and the like.

The camera 130 acquires images of a space. In this case, the camera 130 may rotate and may acquire images of a space captured in all directions.

The driver 140 moves the robot 100. As an example, the robot 100 may perform autonomous driving through the driver 140.

The position recognizer 150, the situation recognizer 160 and the controller 170 may be processor-based modules. The processor may include one or more of a central processing unit, an application processor or a communication processor.

The position recognizer 150 recognizes a location of the robot 100 in a space. That is, the robot 100 may estimate a location of the robot at the same time as the robot draws up a map using the technology of simultaneous localization and mapping (SLAM). Accordingly, the position recognizer 150 may recognize a location of the robot 100 based on coordinates of the map and the estimated position.

The situation recognizer 160 recognizes a situation of a user based on situation information on the user.

As an example, the situation of the user may be a situation in which the user and the robot 100 in the space are not in the same sub-space. The situation recognizer 160 may recognize the above-described situation by analyzing the location of the robot 100, recognized through the position recognizer 150 and by analyzing the image of the space, acquired through the camera 130.

As another example, the situation of the user may be a situation in which an image is received from the external server 220 in a time period preset by the user. The situation recognizer 160 may recognize the above-described situation based on the time period stored in the robot 100 by the user and based on results of real-time monitoring preformed by the communicator 110.

As yet another example, the situation of the user may be a situation in which the user located outside the space accesses the external server 220 through a terminal device and desires to arrange for an image to be transmitted to the robot 100 at preset first time (e.g., the time at which the user leaves work). That is, the user may access the external server 220 through an application installed on the terminal device, and the situation recognizer 160 may recognize the above-described situation using information transmitted from the external server 220.

In addition to the above-described examples, there may be various situations of the user.

The controller 170 may control at least one of other components of the robot 100 or may perform calculation or data processing in relation to communication.

Specifically, the controller 170 selects a first display device among the plurality of display devices based on at least one of a situation of a user, the type of an image, and state information of the plurality of display devices. The first display device is a display device for displaying images.

Though not illustrated in FIG. 1, the robot 100 may further include a speaker that outputs a voice message.

Figure 3:
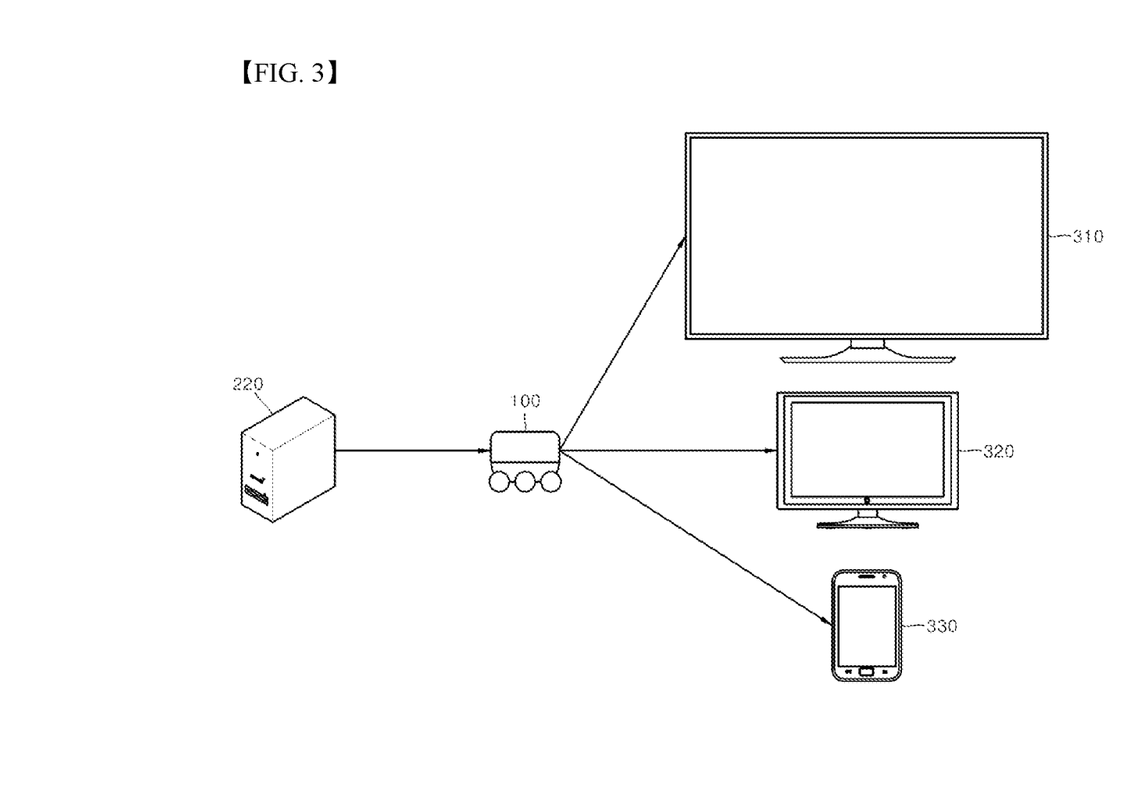
FIG. 3 is a view illustrating an example of a space in which a robot is placed according to an embodiment of the present disclosure.

In short, the robot 100 according to the present disclosure, as illustrated in FIG. 3, serves as a network hub that delivers an image received from the external server 220 to any one of the plurality of display devices such as the TV 310, the monitor 320, the table PC 330 and the like in the space. That is, the robot 100 may perform the function of screen mirroring the display device.

Accordingly, the user may watch an image readily no matter where the user is in a space. Specifically, size limits of the screen of the robot 100 providing image services are overcome, thereby enabling the user to watch images on a large screen.

Figure 4:
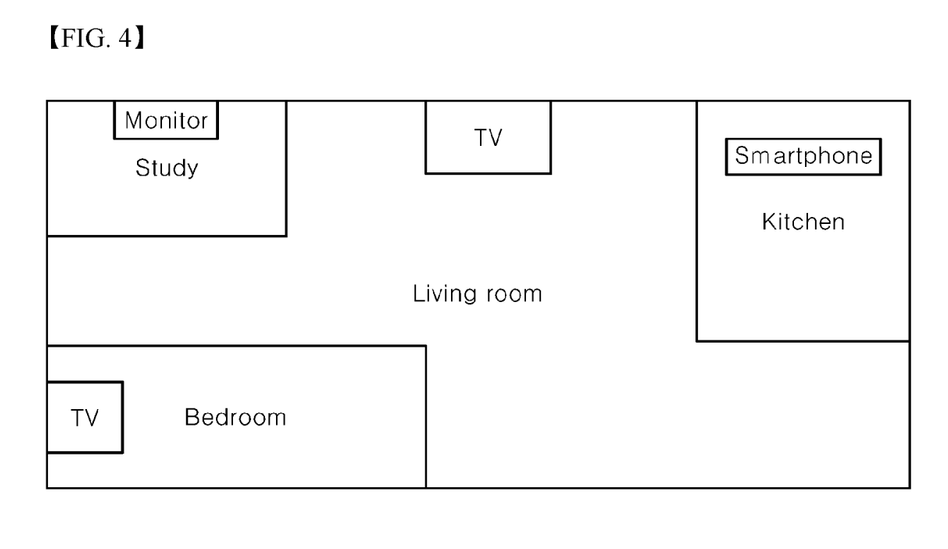
FIGS. 4 to 7 are flow charts illustrating a method of displaying an image using a robot according to an embodiment of the present disclosure.

Below, operations of the robot 100 according to the present disclosure are specifically described with reference to the accompanying drawings. In this case, suppose that the robot 100 moves in the space (a house) illustrated in FIG. 4 and that positions of the plurality of display devices are input previously.

Figure 5:
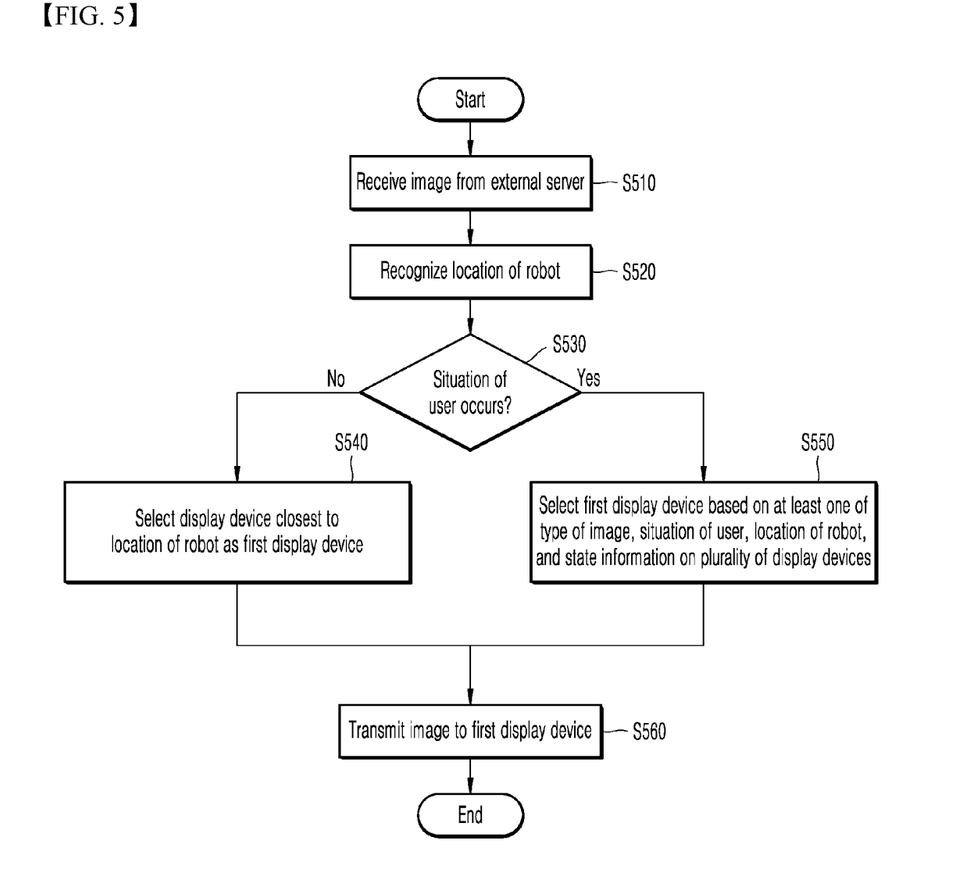

FIG. 5 is a flow chart illustrating a method of displaying an image using the robot according to an embodiment of the present disclosure. Below, operations in each step are described.

A communicator 110 receives an image from an external server 220 (S510), and a position recognizer 150 recognizes a location of a robot 100 (S520).

Next, a controller 170 determines whether a situation of a user occurs (S530).

If the situation of the user does not occur, the controller 170 selects a display device closest to the location of the robot 100 among a plurality of display devices in the space as a first display device (S540). As an example, if the robot 100 is placed in a living room 210, the controller 170 selects a TV in the living room 210 as a first display device.

When the first display device is powered off, the controller 170 generates an instruction for powering on the first display device, and the communicator 110 may transmit the instruction for powering on the first display device to the first display device. This may be uniformly applied in a situation described below.

Conversely, if the situation of the user occurs, the controller 170 selects a first display device among the plurality of display devices based on at least one of the type of an image transmitted by the external server 220, the situation of the user, a location of the robot and state information on the plurality of display devices (S550).

Then the communicator 110 transmits the image transmitted by the external server 220 to the first display device (S560). The image transmitted by the communicator 110 is executed (or displayed) by the first display device.

The robot 100 may generate a message in relation to the display of the image to the user prior to transmitting the image to the first display device, and may transmit the message to the first display device. The first display device may display the message.

The message may include a notification of the transmission of the image. As an example, the message may include a notification of "Do you want the first display device to display the image received from the external device?", and the notification may be displayed on a display unit. Accordingly, when the user does not want to watch the image, the notification may help alleviate possible inconvenience caused to the user.

Additionally, the message may further include below-described details of priority given to the plurality of display devices. In this case, the first display device is a display device given top priority among the plurality of display devices. As an example, the message may include a notification of "A TV, a monitor, and a tablet PC may display an image received from an external device. Which one do you want to use to display the image?" Accordingly, the user may select a device for displaying the image.

The above-described message may be output as a voice message through a speaker of the robot 100.

Figure 6:
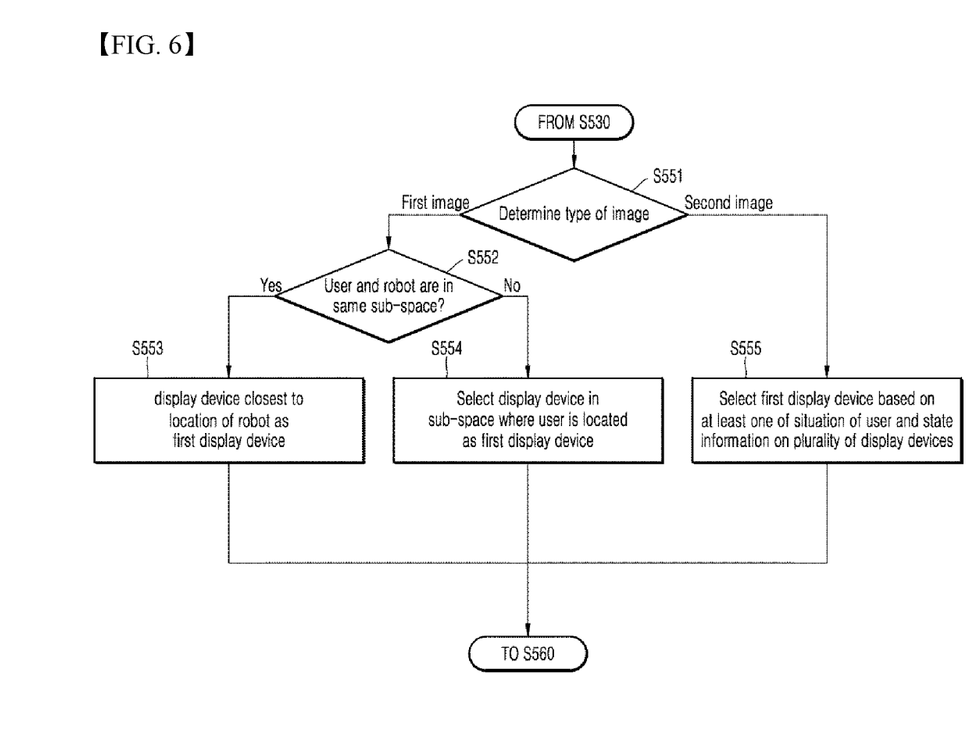

Below, step 550 is specifically described with reference to FIG. 6.

First, the controller 170 determines the type of an image (S551). That is, the controller 170 determines whether the image is a first image or a second image.

As described above, the first image may be an image for video calls, and the second image may be a contents image such as a movie, a drama and the like.

When the image is the first image, the controller 170 determines whether the user and the robot 100 are in the same sub-space (i.e., a room) (S552). That is, in step 552, the controller 170 determines a situation of the user.

If the user and the robot 100 are in the same sub-space, the controller 170 selects a displace device closest to a location of the robot 100 among the plurality of display devices as a first display device (S553).

Conversely, if the user and the robot 100 are not in the same sub-space, the controller 170 selects a displace device located in the sub-space in which the user is located, among the plurality of display devices, as a first display device (S554). That is, the user wants to answer a video call immediately. Accordingly, the controller 170 of the robot 100 may select a display device closest to the user who receives the video call as a first display device.

When the image is the second image, the controller 170 selects a first display device among the plurality of display devices based on at least one of a situation of the user and state information on the plurality of display devices (S555).

According to a first embodiment of the present disclosure, if the situation of the user is a situation in which an image is received from the external server 220 in a time period preset by the user, the controller 170 may select a display device located in a sub-space preset by the user among the plurality of display devices as a first display device.

As an example, the time period preset by the user may be a "bed time period" and the display device located in the sub-space preset by the user may be a "TV in a bedroom". That is, the user wants to watch the image on the TV in the bedroom in the bed time period. Accordingly, the controller 170 may select the TV in the bedroom as a first display device.

Additionally, according to a second embodiment of the present disclosure, if the situation of the user is a "situation in which the user located outside the space accesses the external server 220 through a terminal device and desires to arrange for an image to be transmitted to the robot 100 at preset first time", the controller 170 may select a preset display device among the plurality of display devices as a first display device and may generate an instruction for setting execution of the image. Additionally, the communicator 110 may transmit the instruction for setting execution of the image together with the image (S560).

As an example, in a situation in which the user is on the way home after work, and wants to watch the image transmitted from the external server 220 as soon as the user arrives home, the robot 100 may perform the above-described operations and may control the TV in the living room such that the TV may immediately display the image.

Further, according to a third embodiment of the present disclosure, the controller 170 may select a first display device based on priority given to the plurality of display devices according to screen sizes and based on whether the plurality of display devices may display images.

Figure 7:
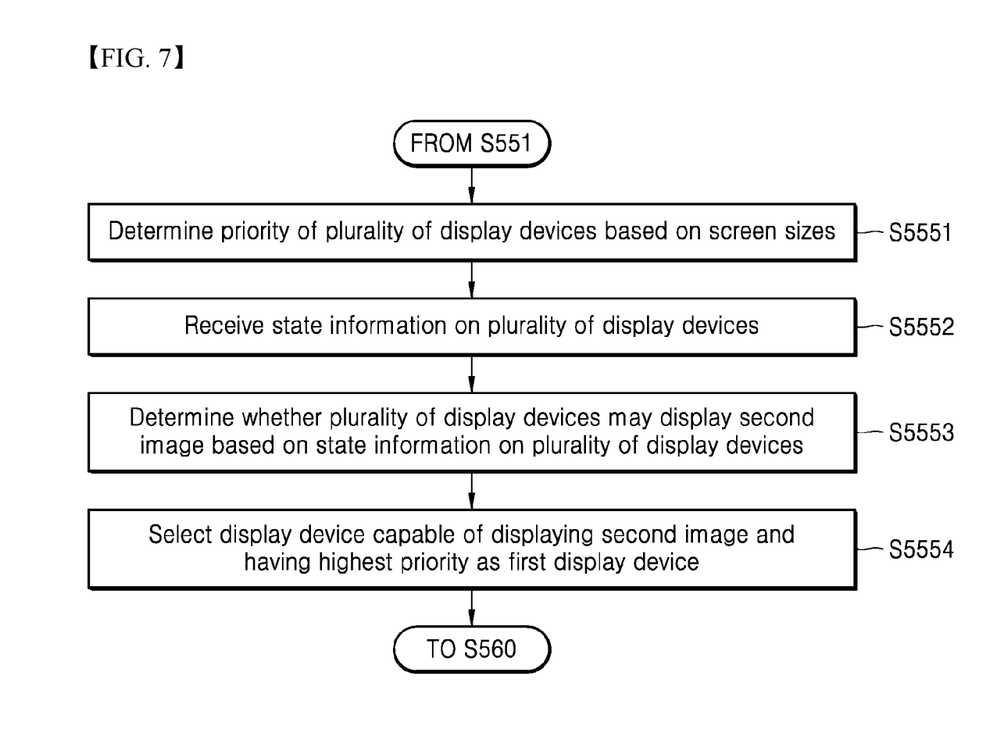

FIG. 7 is a flow chart illustrating step 555 according to the above-described third embodiment. Below, operations in each step are described.

First, a controller 170 determines priority of a plurality of display devices based on sizes of screens (S5551). In this case, information on the sizes of screens may be previously stored in the robot 100.

As an example, when the plurality of display devices include a TV, a monitor and a tablet PC, priority may be given in the order of "the TV>the monitor>the tablet PC".

Next, the communicator 110 receives state information on the plurality of display devices (S5552).

In this case, the state information may include information on changes in volume levels on the TV and changes in channels on the TV, contents displayed on the TV, and contents displayed on the monitor.

Next, the controller 170 determines whether a second image may be displayed on the plurality of display devices based on the state information on the plurality of display devices (S5553). That is, the controller 170 determines whether each of the plurality of display devices may display the second image received from the external server 220, and, to this end, the state information on the plurality of display devices is used.

Finally, the controller 170 selects a display device that is capable of displaying the second image and that has the highest priority as a first display device among the plurality of display devices (S5554).

As an example, priority may be determined in the order of "a TV>a monitor>a tablet PC". When the TV may not display the second image and the monitor and the tablet PC may display the second image, the monitor may be selected as a first display device.

Below, examples of step S554 are specifically described.

As a first embodiment of the present disclosure, when the display device is powered off, the controller 170 determines that the display device may not display the second image.

As a second embodiment of the present disclosure, when the display device is a powered-on TV, the controller 170 determines whether the TV may display the second image based on at least one of information on changes in volumes levels on the TV and information on changes in channels on the TV.

In this case, when channels are changed on the TV a plurality of times in a preset time period prior to the current point in time, the controller 170 determines that the TV may display the second image.

That is, when channels are changed on the TV many times, this indicates that the user cannot concentrate on contents displayed on the TV. Accordingly, the controller 170 determines that the second image may be displayed.

Additionally, when volumes levels on the TV are increased in a preset time period prior to the current point in time, the controller 170 determines that the TV may not display the second image.

That is, when the volume levels on the TV are increased, this indicates that the user is watching contents displayed on the TV while concentrating on the contents. In this case, when the second image is displayed on the TV, the user watching on TV may be disturbed by the second image. Accordingly, the controller 170 determines that the second image may not be displayed.

As a third embodiment of the present disclosure, when the display device is a powered-on TV, the controller 170 determines whether the second image may be displayed on the TV based on information on contents displayed on the TV.

Specifically, when the contents displayed on the TV are main contents, the controller 170 determines that the TV may not display the second image. When the contents displayed on the TV are advertisement contents, the controller 170 determines that the TV may display the second image.

That is, when main contents such as a drama, a movie, home shopping and the like are displayed on the TV, the controller 170 determines that the second image may not be displayed not to disturb the user's watching TV. When additional contents of advertisements run on the TV for 10 to 20 seconds, the controller 170 determines that the second image may be displayed.

As a fourth embodiment of the present disclosure, when the display device is a powered-on monitor, the controller 170 determines whether the second image may be displayed on the monitor based on information on contents displayed on the monitor. The information on contents displayed on the monitor may be transmitted by the monitor itself, or may be transmitted by a PC connected to the monitor.

Specifically, when contents displayed on the monitor are contents that are provided in real time (e.g., streaming games or streaming images), the controller 170 determines that the monitor may not display the second image, and when contents displayed on the monitor are contents that are provided in non-real time, the controller 170 determines that the monitor may display the second image.

That is, when real-time contents are discontinued, it may cause inconvenience to the user. Accordingly, the controller 170 determines that the second image may be displayed only when contents that are provided in non-real time are provided.

In short, the robot 100 according to the present disclosure serves as a hub of networks broadcasting images. Accordingly, the user may watch images provided by the robot on a large screen conveniently.

When all elements of the embodiments of the present disclosure are described to be combined into one element or to operate in combination, the present disclosure is not limited to the embodiments and all the elements may be selectively combined to operate within the scope of the present disclosure. All the elements may be embodied can be embodied as independent hardware pieces, respectively, or some or all of the elements may be selectively combined and may be embodied as a computer program including a program module that performs some or all functions combined into one or more hardware pieces. Codes or code segments of the computer program can be easily inferred by those skilled in the art. The computer program can be stored in a computer-readable recording medium and can be read and executed by a computer, whereby the embodiments of the present disclosure can be realized. Examples of a storage medium having stored the computer program include storage mediums such as a magnetic recording medium, an optical recording medium, and a semiconductor recording medium. The computer program for realizing the embodiments of the present disclosure includes a program module which is transmitted via an external device in real time.

While embodiments of the present disclosure have been described above, various changes or modifications can be made thereon by those skilled in the art. Accordingly, it should be understood that such changes and modifications belong to the scope of the present disclosure without departing from the scope of the present disclosure.

What is claimed is:

1. A robot comprising:
a transceiver configured to communicate with a plurality of display devices in a space including a plurality of sub-spaces and an external server; and
a controller configured to select a first display device among the plurality of display devices based on at least one of a location of the robot in the space, a situation of a user of the robot, a type of an image, or state information on the plurality of display devices,
wherein the transceiver is further configured to transmit the image to the first display device, so that the transmitted image is executed on the first display device,
wherein the image is a first image for a video call that is transmitted by the external server, and the situation of the user is a situation in which the user and the robot are not in a same sub-space of the plurality of sub-spaces, and
wherein the controller is further configured to select, among the plurality of display devices, a display device located in a sub-space of the plurality of sub-spaces, in which the user is located, as the first display device.

2. The robot of claim 1,
wherein the image is stored in the robot, and
wherein the transceiver is further configured to transmit the stored image to the first display device.

3. The robot of claim 1,
wherein the transceiver is further configured to receive the image from the external server and transmit the received image to the first display device.

4. The robot of claim 1,
wherein the image is a second image that is a contents image,
wherein the situation of the user is a situation in which the second image is received from the external server in a time period preset by the user, and
wherein the controller is further configured to select, among the plurality of display devices, a display device located in a sub-space of the plurality of sub-spaces that is preset by the user, as the first display device.

5. The robot of claim 1,
wherein the image is a second image that is a contents image,
wherein the situation of the user is a situation in which the user is located outside the space, accesses the external server through a terminal device, and desires to arrange for the second image to be transmitted to the robot at a first preset time,
wherein the transceiver is further configured to receive the image at the first preset time,
wherein the controller is further configured to select a preset display device, among the plurality of display devices, as the first display device, and generate an instruction for setting execution of the second image, and
wherein the transceiver is further configured to transmit the instruction for setting the execution of the second image to the first display device.

6. The robot of claim 1,
wherein the image is a second image that is a contents image, and
wherein the controller is further configured to select the first display device based on a priority of the plurality of display devices according to screen sizes and whether the plurality of display devices can display the second image.

7. The robot of claim 6, wherein the controller is further configured to select, among the plurality of display devices, a display device that is capable of displaying the image and that is given highest priority, as the first display device.

8. The robot of claim 6,
wherein the plurality of display devices include a television (TV),
wherein the transceiver is further configured to receive information on changes in volume levels on the TV and information on changes in channels on the TV, and
wherein the controller is further configured to determine whether the image can be displayed on the TV based on at least one of the information on the changes in the volume levels on the TV or the information on the changes in the channels on the TV.

9. The robot of claim 8, wherein:
when the channels are changed on the TV a plurality of times in a preset time period prior to a current point in time, the controller is further configured to determine that the TV can display the image; and
when the volume levels on the TV are increased in the preset time period, the controller is further configured to determine that the TV cannot display the image.

10. The robot of claim 6, wherein the plurality of display devices include a television (TV),
wherein the transceiver is further configured to receive information on contents displayed on the TV, and
when the contents displayed on the TV are main contents, the controller is further configured to determine that the TV cannot display the image, and, when the contents displayed on the TV are advertisement contents, the controller is further configured to determine that the TV can display the image.

11. The robot of claim 6,
wherein the plurality of display devices include a monitor,
wherein the transceiver is further configured to receive information on contents displayed on the monitor,
wherein, when the contents displayed on the monitor are contents that are provided in real time, the controller is further configured to determine that the monitor cannot display the image, and
wherein, when the contents displayed on the monitor are contents that are provided in non-real time, the controller is further configured to determine that the monitor can display the image.

12. A method for displaying an image using a robot, the method comprising;
selecting, by at least one controller, a first display device among a plurality of display devices based on at least one of a location of the robot in a space, a situation of a user of the robot, a type of the image, or state information on the plurality of display devices in the space; and
transmitting, by a transceiver, the image to the first display device,
wherein the image is a second image that is a contents image,
wherein selecting the first display device includes selecting the first display device based on a priority of the plurality of display devices according to screen sizes and whether the plurality of display devices can display the image.

13. The method of claim 12,
wherein the image is a first image for a video call that is received from a communication server through the transceiver,
wherein the space includes a plurality of sub-spaces,
wherein the situation of the user is a situation in which the user and the robot are not in a same sub-space of the plurality of sub-spaces, and
wherein selecting the first display device includes selecting, among the plurality of display devices, a display device located in a sub-space of the plurality of sub-spaces in which the user is located, as the first display device.

14. The method of claim 12,
wherein the plurality of display devices include a television (TV),
wherein the state information includes information on changes in volume levels on the TV and information on changes in channels on the TV, and
wherein selecting the first display device includes determining whether the second image can be displayed on the TV based on at least one of the information on the changes in the volume levels on the TV or the information on the changes in the channels on the TV.

15. The method of claim 12,
wherein the plurality of display devices include a television (TV),
wherein the state information includes information on contents displayed on the TV, and
wherein selecting the first display device includes determining that the TV cannot display the second image when the contents displayed on the TV are main contents, and determining that the TV can display the second image when the contents displayed on the TV are advertisement contents.

16. The method of claim 12,
wherein the plurality of display devices include a monitor,
wherein the state information includes information on contents displayed on the monitor, and
wherein selecting the first display device includes determining that the monitor cannot display the second image when the contents displayed on the monitor are contents that are provided in real time, and determining that the monitor can display the second image when the contents displayed on the monitor are contents that are provided in non-real time.

17. A robot comprising:
a transceiver configured to communicate with a plurality of display devices in a space; and
a controller configured to select a first display device among the plurality of display devices based on a priority of the plurality of display devices according to screen sizes and whether the plurality of display devices can display an image,
wherein the transceiver is further configured to transmit the image to the first display device, so that the transmitted image is executed on the first display device.

* * * * *